United States Patent
Campbell

(10) Patent No.: US 9,524,445 B2
(45) Date of Patent: Dec. 20, 2016

(54) METHODS AND SYSTEMS FOR SUPPRESSING NON-DOCUMENT-BOUNDARY CONTOURS IN AN IMAGE

(71) Applicant: Sharp Laboratories of America, Inc., Camas, WA (US)

(72) Inventor: Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/634,509

(22) Filed: Feb. 27, 2015

(65) Prior Publication Data

US 2016/0253571 A1 Sep. 1, 2016

(51) Int. Cl.
| | | |
|---|---|---|
| *G06K 9/00* | (2006.01) | |
| *G06K 9/46* | (2006.01) | |
| *G06T 7/00* | (2006.01) | |
| *G06T 5/00* | (2006.01) | |
| *G06T 5/40* | (2006.01) | |

(52) U.S. Cl.
CPC ............. *G06K 9/4671* (2013.01); *G06K 9/00* (2013.01); *G06K 9/4604* (2013.01); *G06T 5/002* (2013.01); *G06T 5/40* (2013.01); *G06T 7/0085* (2013.01); *G06T 2207/10004* (2013.01)

(58) Field of Classification Search
CPC H04N 1/047; H04N 1/195; H04N 2201/0436; H04N 2201/04737; H04N 1/1013; H04N 2201/02439; H04N 2201/04732; H04N 1/00737; H04N 1/053; H04N 1/4092; H04N 1/32203; H04N 1/00037; H04N 2201/3239; H04N 1/00867; H04N 1/00872; H04N 1/3873; H04N 1/193; H04N 1/00748; H04N 1/32309; H04N 1/387; H04N 1/40; G06K 9/3283; G06K 9/46; G06K 9/481; G06K 9/00463; G06K 9/00442; G06K 9/00228; G06K 9/00503; G06K 9/32; G06K 9/3275; G06K 2209/01; G06K 9/4604; G06K 9/344; G06K 9/72; G06T 2201/10008; G06T 2207/30176; G06T 9/00; G06T 9/20; G06T 2201/0065; G06T 7/0081; G06T 7/0085; G06T 7/004; G06T 7/0083; G06T 1/0064; G06T 2201/0052; G06T 2207/10008; G06T 2207/20136; G06T 7/00; G06F 17/30259; G06F 17/274; G06N 5/047; G03F 9/7003; G03F 9/7088; G03G 15/5062

(Continued)

(56) References Cited

U.S. PATENT DOCUMENTS

| | | | | |
|---|---|---|---|---|
| 5,579,090 A | * | 11/1996 | Sasanuma | H04N 1/4078 358/521 |
| 5,886,797 A | * | 3/1999 | Shimura | H04N 1/4092 358/448 |

(Continued)

OTHER PUBLICATIONS

Clark et al., "Clark" ("recognizing text in real scenes", Jul. 2002).*

*Primary Examiner* — Vu Le
*Assistant Examiner* — Aklilu Woldemariam
(74) *Attorney, Agent, or Firm* — Law Office of Gerald Maliszewski; Gerald Maliszewski

(57) ABSTRACT

Aspects of the present invention are related to systems, methods and apparatus for boundary detection, in an image, by suppression of contours resulting from background textures and text in the image.

16 Claims, 5 Drawing Sheets

(58) Field of Classification Search
USPC .... 382/195, 275, 254, 286, 298; 355/25, 47, 355/52
See application file for complete search history.

(56) References Cited

U.S. PATENT DOCUMENTS

| | | | |
|---|---|---|---|
| 6,256,411 B1* | 7/2001 | Iida | G06T 7/004 358/486 |
| 6,330,050 B1 | 12/2001 | Takahashi et al. | |
| 6,993,190 B1* | 1/2006 | Nguyen | G06K 9/4609 358/519 |
| 7,555,139 B2* | 6/2009 | Rhoads | G06T 1/0064 382/100 |
| 7,876,471 B2* | 1/2011 | Tojo | G06F 17/30244 358/1.1 |
| 8,023,704 B2* | 9/2011 | Oosawa | G06F 19/321 382/128 |
| 8,620,068 B2* | 12/2013 | Ito | G06T 9/00 382/164 |
| 9,082,181 B2* | 7/2015 | Sun | G06K 9/00442 |
| 2003/0198398 A1 | 10/2003 | Guan et al. | |
| 2004/0022451 A1 | 2/2004 | Fujimoto et al. | |
| 2004/0081332 A1* | 4/2004 | Tuttle | G06K 9/00442 382/100 |
| 2005/0110882 A1* | 5/2005 | Fukuda | G06T 3/40 348/234 |
| 2005/0238244 A1* | 10/2005 | Uzawa | G06T 9/20 382/242 |
| 2006/0171587 A1* | 8/2006 | Kanatsu | G06K 9/00456 382/173 |
| 2009/0067724 A1* | 3/2009 | Hirohata | G03G 21/046 382/190 |
| 2009/0147105 A1* | 6/2009 | Du | G06T 5/006 348/234 |
| 2009/0208130 A1* | 8/2009 | Kishi | G06K 9/481 382/266 |
| 2010/0014758 A1* | 1/2010 | Yano | G06K 9/00228 382/195 |
| 2010/0225937 A1 | 9/2010 | Simske et al. | |
| 2010/0296730 A1* | 11/2010 | Matsuoka | H04N 1/4092 382/166 |
| 2012/0206778 A1 | 8/2012 | Shirai et al. | |
| 2012/0320427 A1 | 12/2012 | Zheng et al. | |
| 2013/0094764 A1* | 4/2013 | Campbell | G06T 5/006 382/199 |
| 2014/0362248 A1* | 12/2014 | Ishida | H04N 5/23293 348/222.1 |
| 2014/0368891 A1* | 12/2014 | Beato | G06T 7/0085 358/474 |

\* cited by examiner

METHODS AND SYSTEMS FOR SUPPRESSING NON-DOCUMENT-BOUNDARY CONTOURS IN AN IMAGE

FIELD OF THE INVENTION

Embodiments of the present invention relate generally to methods and systems for boundary detection in an image and, in particular, to methods and systems for suppression of contours resulting from background textures and text in the image.

BACKGROUND

Detection of the boundaries of a document, for example a single page, facing pages in a book and other documents, in a digital image may be important for enhancement, restoration, image understanding and other imaging tasks. However, document content and background textures complicate detection processes that rely solely on low-level features. Methods and systems that suppress the edges from text and other document content along with edges from background textures may be desirable.

SUMMARY

Some embodiments of the present invention comprise methods, systems and apparatus for generating a plurality of candidate boundary contours from a document image. According to a first aspect of the present invention, a medium-scale luminance image and a low-scale luminance image may be formed using the document image. According to a second aspect of the present invention, a plurality of corner features may be extracted from the medium-scale luminance image. According to a third aspect of the present invention, a plurality of edge features may be extracted from the low-scale luminance image. According to a fourth aspect of the present invention, text regions may be detected in an image associated with the plurality of extracted corner features. According to a fifth aspect of the present invention, an initial plurality of candidate boundary contours may be detected in an image associated with the plurality of edge features. According to a sixth aspect of the present invention, the initial plurality of candidate boundary contours may be filtered using the detected text regions.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a chart showing exemplary embodiments of the present invention comprising: preprocessing a document image to form a medium-resolution, as compared to the resolution of the document image, luminance image and a low-resolution, as compared to the resolution of the medium-resolution image, luminance image; extracting corner features from the medium-resolution luminance image, thereby forming a corner-feature image, and edge features from the low-resolution image, thereby forming an edge-map image; determining vanishing points using the edge-map image; detecting text regions using the corner-feature image; generating an initial plurality of candidate boundary contours from the edge-map image; and filtering the initial plurality of candidate boundary contours to generate a final plurality of candidate boundary contours;

DETAILED DESCRIPTION OF EXEMPLARY EMBODIMENTS

Figure 1:
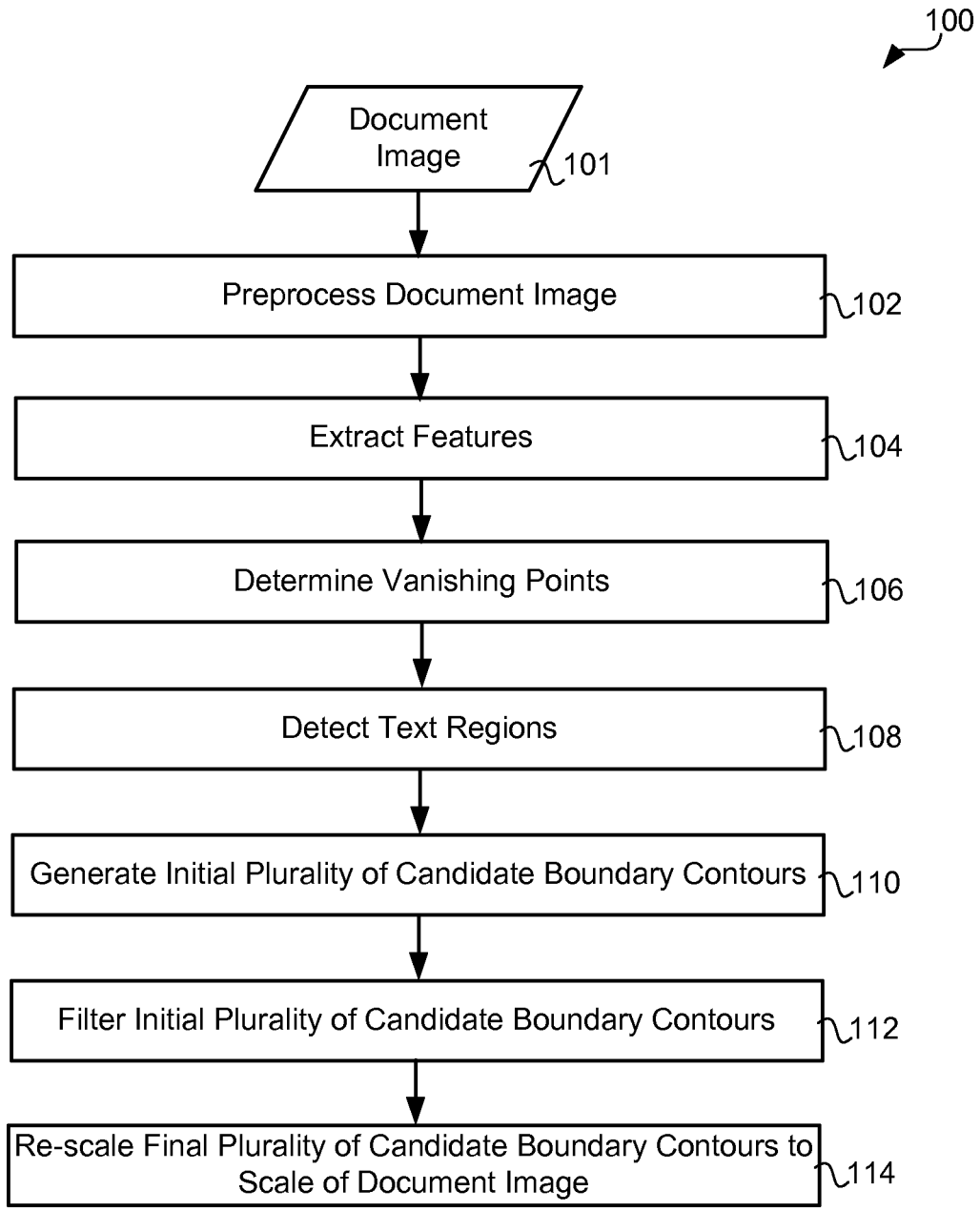

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

Detection of the boundaries of a document, for example a single page, facing pages in a book and other documents, in a digital image may be important for enhancement, restoration, image understanding and other imaging tasks. However, document content and background textures complicate detection processes that rely solely on low-level features. Methods and systems that suppress the edges from text and other document content along with edges from background textures may be desirable.

Some embodiments of the present invention may be described in relation to FIG. 1. FIG. 1 depicts a method 100, for generating candidate document-boundary contours from a document image 101, comprising preprocessing 102 a document image 101, for example, an image formed in a scanning process, a camera-captured image and other input images, wherein the image is of a bound document, for example, a book, a magazine and other bound documents.

Figure 2:
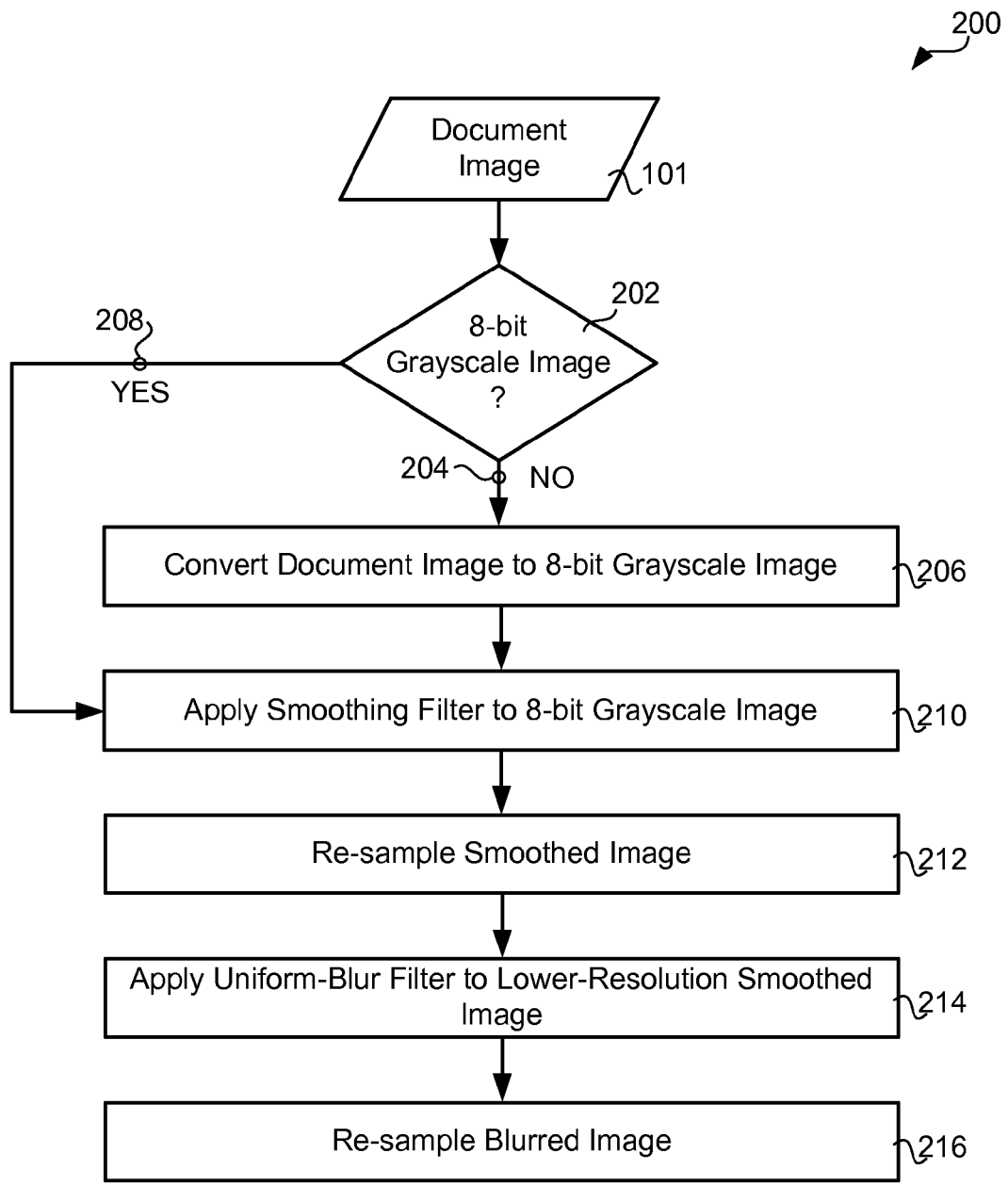
FIG. 2 is a chart showing exemplary embodiments of a method for preprocessing, according to some embodiments of the present invention, a document image to form a medium-resolution, as compared to the resolution of the document image, luminance image and a low-resolution, as compared to the resolution of the medium-resolution image, luminance image.

In some embodiments of the present invention, the preprocessing 102 of the document image 101 may be performed according to a method 200 illustrated in FIG. 2. This exemplary preprocessing method 200 may comprise determining 202 whether the document image 101 is an 8-bit grayscale image. If the document image 101 is not 204 an 8-bit grayscale image, then the document image 101 may be converted 206 to an 8-bit grayscale image. In some embodiments of the present invention, wherein the document image 101 is an RGB image, a document-image byte order, for example, BGR, BRG, GBR, GRB, RGB and RBG, may be input to color conversion 206. A smoothing filter may be applied 210 to the 8-bit grayscale image.

If the document image 101 is 208 an 8-bit grayscale image, the smoothing filter may be applied 210 to the 8-bit grayscale document image 101.

In some embodiments of the present invention, the smoothing filter may comprise a Gaussian filter. The Gaussian filter may be characterized by a width parameter and a height parameter that correspond to the width and the height, respectively, of the Gaussian kernel. These two parameters, the width parameter and the height parameter, may be used to effectuate axis-aligned directional filtering. When the value of the width parameter is greater than the value of the height parameter, the smoothing filter will filter more aggressively along the width of the 8-bit grayscale image compared to the height. Conversely, when the value of height parameter is greater than the value of the width parameter, the smoothing filter will filter more aggressively along the height of the 8-bit grayscale image compared to the width. In alternative embodiments a uniform smoothing may be used.

The smoothed image may be re-sampled 212 to a lower resolution, thereby producing a lower-resolution smoothed image, which may be denoted imgLMed. The re-sampling operation may preserve the aspect ratio of the smoothed image. In some embodiments of the present invention, the re-sampling 212 may be controlled by a dimension parameter. The dimension parameter may be the target size for the largest dimension in the lower-resolution smoothed image. In an exemplary embodiment, the target size may be 640. Thus, denoting the number of rows and columns in the smoothed image as in.rows and in.cols, respectively, the number of rows and columns in the lower-resolution smoothed image as imgLMed.rows and imgLMed.cols, respectively, and the target size for the largest dimension in the lower-resolution smoothed image as LMedMaxDim, then a scale factor, which may be denoted Medsf, between the smoothed image and the lower-resolution smoothed image may be computed according to:

$$Medsf = \frac{LMedMaxDim}{\max(in.rows,\ in.cols)}.$$

A uniform-blur filter may be applied 214 to the lower-resolution smoothed image of size imgLMed.rows by imgLMed.cols. In some embodiments of the present invention, axis-aligned directional filtering may be performed with a first uniform window in one direction and a second uniform window in a second, orthogonal direction.

The blurred image may be re-sampled 216 to a lower resolution, thereby producing a lower-resolution blurred image, which may be denoted imgLLow. The re-sampling operation may preserve the aspect ratio of the blurred image. In some embodiments of the present invention, the re-sampling 216 may be controlled by a dimension parameter. The dimension parameter may be the target size for the largest dimension in the lower-resolution blurred image. In an exemplary embodiment, the target size may be 320. Thus, recalling that the number of rows and columns in the blurred image are imgLMed.rows and imgLMed.cols, respectively, and denoting the number of rows and columns in the lower-resolution blurred image as imgLLow.rows and imgLLow.cols, respectively, and the target size for the largest dimension in the lower-resolution blurred image as LLowMaxDim, then a scale factor between the blurred image and the lower-resolution blurred image, which may be denoted Lowsf, may be computed according to:

$$Lowsf = \frac{LLowMaxDim}{\max(imgLMed.rows,\ imgLMed.cols)}.$$

Figure 3:
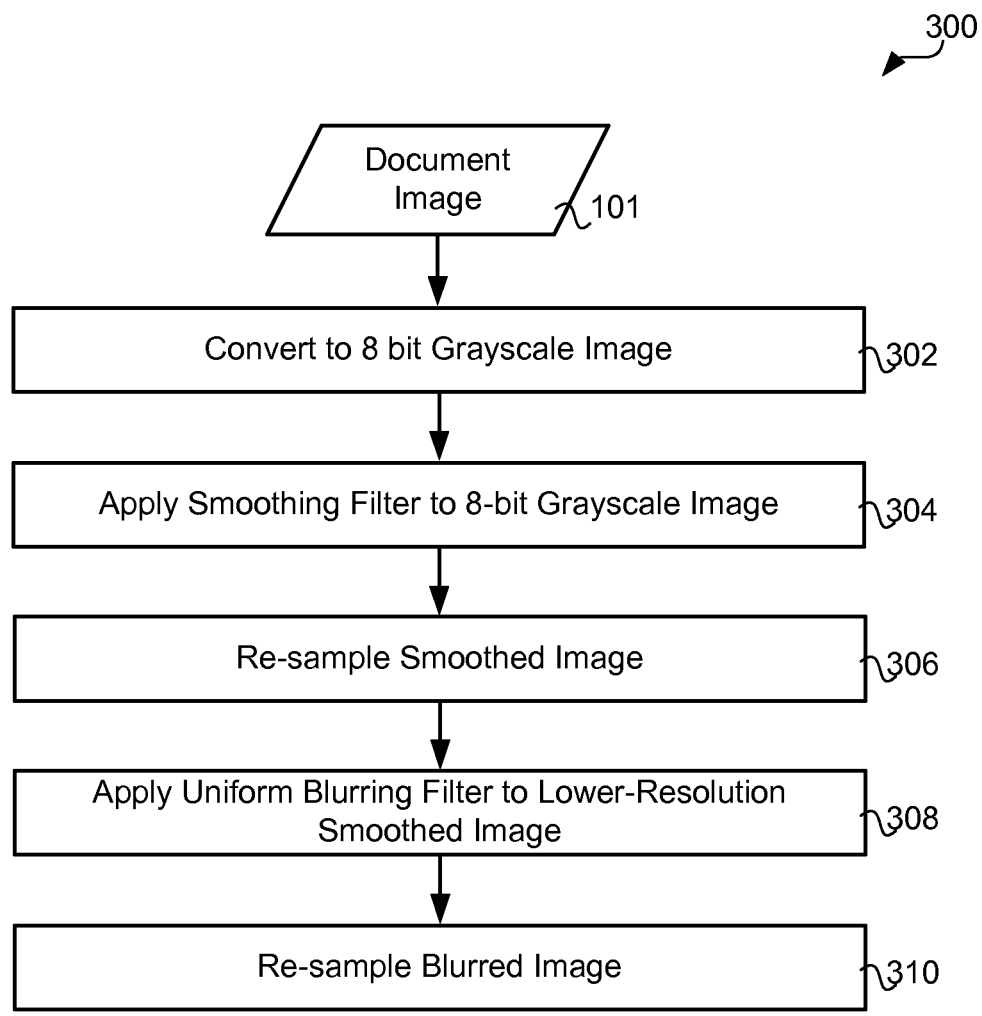
FIG. 3 is a chart showing exemplary embodiments of a method for preprocessing, according to some embodiments of the present invention, a document image to form a medium-resolution, as compared to the resolution of the document image, luminance image and a low-resolution, as compared to the resolution of the medium-resolution image, luminance image.

In some embodiments of the present invention, the preprocessing 102 may be performed according to a method 300 illustrated in FIG. 3. In these exemplary embodiments, the document image 101 may be converted 302 to an 8-bit grayscale image. In some embodiments of the present invention, wherein the document image is an RGB image, a document-image byte order, for example, BGR, BRG, GBR, GRB, RGB and RBG, may be input to color conversion 302.

A smoothing filter may be applied 304 to the 8-bit grayscale image.

In some embodiments of the present invention, the smoothing filter may comprise a Gaussian filter. The Gaussian filter may be characterized by a width parameter and a height parameter that correspond to the width and the height, respectively, of the Gaussian kernel. These two parameters, the width parameter and the height parameter, may be used to effectuate axis-aligned directional filtering. When the value of the width parameter is greater than the value of the height parameter, the smoothing filter will filter more aggressively along the width of the 8-bit grayscale image compared to the height. Conversely, when the value of height parameter is greater than the value of the width parameter, the smoothing filter will filter more aggressively along the height of the 8-bit grayscale image compared to the width. In alternative embodiments a uniform smoothing may be used.

The smoothed image may be re-sampled 306 to a lower resolution, thereby producing a lower-resolution smoothed image, which may be denoted imgLMed. The re-sampling operation may preserve the aspect ratio of the smoothed image. In some embodiments of the present invention, the re-sampling 306 may be controlled by a dimension parameter. The dimension parameter may be the target size for the largest dimension in the lower-resolution smoothed image. Thus, denoting the number of rows and columns in the smoothed image as in.rows and in.cols, respectively, the number of rows and columns in the lower-resolution smoothed image as imgLMed.rows and imgLMed.cols, respectively, and the target size for the largest dimension in the lower-resolution smoothed image as LMedMaxDim, then a scale factor, which may be denoted Medsf, between the smoothed image and the lower-resolution smoothed image may be computed according to:

$$Medsf = \frac{LMedMaxDim}{\max(in.\text{rows}, in.\text{cols})}.$$

A uniform blur filter may be applied 308 to the lower-resolution smoothed image of size imgLMed.rows by imgLMed.cols. In some embodiments of the present invention, axis-aligned directional filtering may be performed with a first uniform window in one direction and a second uniform window in a second, orthogonal direction.

The blurred image may be re-sampled 310 to a lower resolution, thereby producing a lower-resolution blurred image, which may be denoted imgLLow. The re-sampling operation may preserve the aspect ratio of the blurred image. In some embodiments of the present invention, the re-sampling 310 may be controlled by a dimension parameter. The dimension parameter may be the target size for the largest dimension in the lower-resolution blurred image. Thus, recalling that the number of rows and columns in the blurred image are imgLMed.rows and imgLMed.cols, respectively, and denoting the number of rows and columns in the lower-resolution blurred image as imgLLow.rows and imgLLow.cols, respectively, and the target size for the largest dimension in the lower-resolution blurred image as LLowMaxDim, then a scale factor between the blurred image and the lower-resolution blurred image, which may be denoted Lowsf, may be computed according to:

$$Lowsf = \frac{LLowMaxDim}{\max(imgLMed.\text{rows}, imgLMed.\text{cols})}.$$

Referring again to FIG. 1, after preprocessing 102, feature extraction 104 may be performed. Feature extraction 104 may comprise corner detection and edge extraction. Corners may be extracted from the lower-resolution smoothed image, imgLMed, which may also be referred to as the medium-scale image. Exemplary corner detection algorithms include the Shi-Tomasi corner detection algorithm, the Wang and Brady corner detection algorithm, the SUSAN corner detector, the Trajkovic and Hedley corner detector and other corner detection algorithms known in the art. In one exemplary embodiment, an OpenCV implementation of the Shi and Tomasi corner detector may be used. Corner extraction may identify a plurality of corner pixels in the medium-scale image. The location of a corner pixel may be indicated by one of two binary values in a binary corner-feature image. The location of a non-corner pixel may be indicated by the other of the two binary values in the binary corner-feature image.

Edges may be extracted from the lower-resolution blurred image, imgLLow, which also may be referred to as the low-scale image. Exemplary edge detectors include the Canny edge detector and other first-order edge detectors, the Marr-Hildreth operator and other second-order edge detectors and other edge detectors known in the art. In one exemplary embodiment, an OpenCV Canny edge detector may be used with parameter values Th1=45, Th2=15, aperture=3 and L2gradient=true. Edge extraction may identify a plurality of edge pixels in the low-scale image.

In some embodiments of the present invention, the location of an edge pixel may be indicated by one of two binary values in a binary edge-map image, and the location of a non-edge may be indicated by the other of the two binary values in the binary edge-map image. In alternative embodiments of the present invention, the edge strength may be indicated at a pixel location in an edge-map image.

The edge-map image produced in edge extraction may be used to determine 106 vanishing points, for example, a horizontal vanishing point, a vertical vanishing point and other vanishing points related to perspective distortion in a particular direction. In some embodiments of the present invention, document content may augment linear structures extracted from document boundaries and, if present, a document spine. Linear structures estimated from individual characters may be too noisy at a small scale for reliable estimation. Therefore, in some embodiments of the present invention, a plurality of text blocks may be formed using morphological processing. The text blocks may be more robust linear structures due to the inference of direction over a larger spatial extent. In some embodiments of the present invention, vanishing-point determination 106 may comprise morphological processing of the edge-map image produced in edge extraction. In an exemplary embodiment, the morphological processing may comprise a morphological closing operation, followed by erosion and then subtraction of the eroded image from the image formed by the morphological closing operation. Lines may be extracted from the binary mask generated by the morphological processing, and vanishing points may be computed from the extracted lines. One exemplary method for line extraction and vanishing-point determination is described in U.S. patent application Ser. No. 13/275,256, filed Oct. 17, 2011, entitled "Methods, Systems and Apparatus for Correcting Perspective Distortion in a Document Image," invented by Richard John Campbell.

Figure 4:
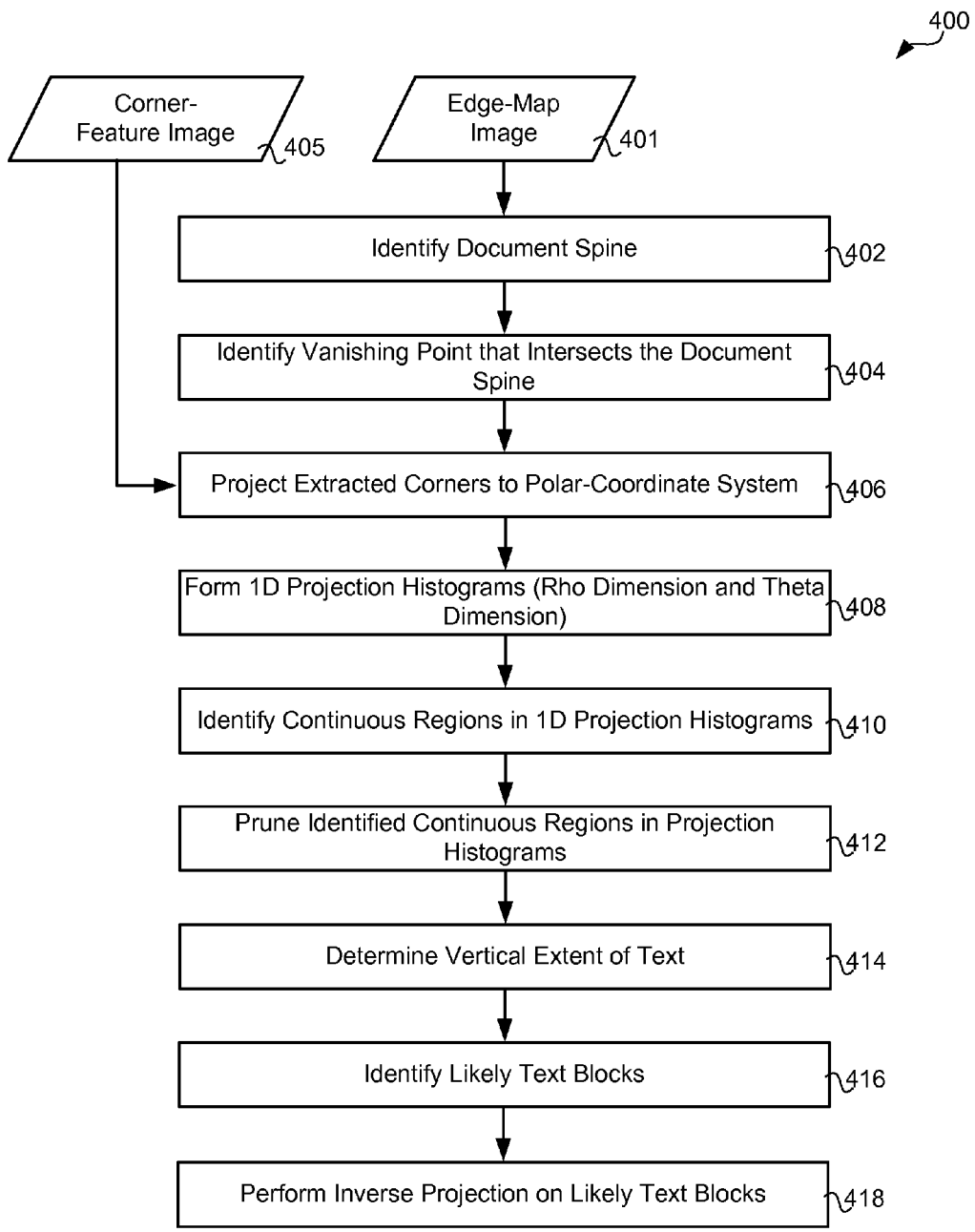
FIG. 4 is a chart showing exemplary embodiments of a method, according to some embodiments of the present invention, for detecting text regions using a corner-feature image.

Using the determined vanishing points, text regions may be detected 108. In some embodiments of the present invention, text-region detection 108 may be effectuated according to a method 400 described in relation to FIG. 4. A document spine may be identified 402 in the edge-map image 401. In some embodiments of the present invention, wherein the aspect ratio of the image sensor and the imaged content match, the direction and location of the document spine may be inferred using the horizontal vanishing point for a document image of a single bound page and the vertical vanishing point for a document image of two facing pages. In alternative embodiments, the document spine may be identified 402 using image analysis. In yet alternative embodiments, the document spine may be identified 402 using user cues. In alternative embodiments, the document spine may be identified 402 using a combination of image analysis and user cues. The vanishing point that intersects the line containing the document spine may be identified 404, and the extracted corners in the corner-feature image 405 may be projected 406 to a polar coordinate system.

In some embodiments of the present invention, projection of a detected corner may comprise determination of a corresponding location, at the scale of the corner-feature image, of the vanishing point that intersects the line containing the document spine. The corresponding location, at the scale of the corner-feature image, of the vanishing point that intersects the line containing the document spine may be denoted vp, and a normalized vector, denoted lv, from the vanishing point, vp, to the center of the corner-feature image, denoted Lcen, may be computed according to:

$$lv = \frac{(Lcen - vp)}{\|Lcen - vp\|},$$

where $\|\cdot\|$ denotes the Euclidean norm.

The vector, denoted lp, from the vanish point, vp, to a point being projected, which may be denoted pt, may be computed according to:

$$lp = (pt - vp),$$

and the projection to polar coordinates, denoted rho and theta, of pt may be computed according to:

$$rho = \|lp\|$$

and $$theta = \sin^{-1}\left(lv \times \frac{lp}{rho}\right),$$

where × denotes the vector cross product.

In some embodiments of the present invention, the floating point rho and theta values may quantized to produce an image structure with the vertical axis associated with the rho dimension and the horizontal axis associated with the theta dimension, the image structure may be referred to as the projected image.

The quantization process may calculate a maximum rho value, a minimum rho value, a maximum theta value and a minimum theta value, denoted maxRho, minRho, maxTheta and minTheta, respectively. In some embodiments of the present invention, an approximation for these minimum and maximum values may be obtained by projecting the corners of the corner-feature image. In alternative embodiments of the present invention, minRho and maxRho may be determined by calculating the intersection of lv with the boundaries of the corner-feature image. In alternative embodiments of the present invention, maxRho, minRho, maxTheta and minTheta may be determined by projecting all of the corner-feature image boundary pixels into polar coordinates and sorting the resulting values to find the respective maximums and minimums.

A quantized index, which may be denoted idxRho, into the rho dimension for a value rho may be computed according to:

$$idxRho = \left(\frac{numQRho - 1}{maxRho - minRho}\right) * (rho - minRho),$$

which may be re-factored into:

$$idxRho = sfRho * (rho - minRho),$$

where:

$$sfRho = \left(\frac{numQRho - 1}{maxRho - minRho}\right)$$

and numQRho denotes the number of quantized rho values. The scale factor, sfRho, may be calculated and stored prior to the projection.

The quantized index, which may be denoted idxTheta, into the theta dimension for a value theta may be calculated according to:

$$idxTheta = sfTheta * (theta - minTheta),$$

where:

$$sfTheta = \left(\frac{numQTheta - 1}{maxTheta - minTheta}\right)$$

and numQTheta denotes the number of quantized theta values. The scale factor, sfTheta, may be calculated and stored prior to the projection.

An indexed rho-theta pair may be inverted to a location, pt, in the corner-feature image according to:

$$rho = idxRho / sfRho + minRho,$$

$$theta = idxTheta / sfTheta + minTheta$$

and $$pt = rho * lp + vp,$$

where $$lp = R * lv$$

and $$R = \begin{pmatrix} \cos(theta) & -\sin(theta) \\ \sin(theta) & \cos(theta) \end{pmatrix}.$$

In some embodiments of the present invention, for one or more scales, a transformation map between a Cartesian-coordinate image space and a polar-coordinate image space and the inverse transformation may be computed, stored and used for feature projection at the associated scale.

In alternative embodiments of the present invention, as points from an image of a first resolution are projected and/or the inverse is computed, a transformation map between a Cartesian-coordinate image space and a polar-coordinate image space and the inverse transformation may be built and used in subsequent processing of any image at the first resolution.

The number of (x,y) pixels mapped to a single (idxRho, idxTheta) bin may vary over an image. In some embodiments of the present invention, this non-uniform mapping may be compensated for by counting the number of (x,y) pixels mapped to an (idxRho,idxTheta) bin and normalizing according to:

$$Iproj(idxRho, idxTheta) = \frac{1}{num} \sum_s I(x, y),$$

where num may denote the number of (x,y) pixels mapped to the (idxRho,idxTheta) bin, Iproj(idxRho,idxTheta) may denote the projected value of the corner features in the set s, where the set s is the set of (x,y) pixels mapped to the (idxRho,idxTheta) bin and I(x,y) may denote the corner-feature image value at pixel (x,y).

A one-dimensional projection histogram may be formed 408 for each of the rho dimension and the theta dimension in the projected corner-feature image, also referred to as the polar-coordinate image. An accumulation value assigned to a rho-quantization bin in a rho projection histogram may be determined by summing the values of the extracted corner pixels in the polar-coordinate image with an indexed rho value equal to the indexed rho associated with the rho-quantization bin. Similarly, an accumulation value assigned to a theta-quantization bin in a theta projection histogram may be determined by summing the values of the extracted corner pixels in the polar-coordinate image with an indexed theta value equal to the indexed theta value associated with the theta-quantization bin.

A plurality of continuous regions in each one-dimension projection histogram may be identified 410. Each one-dimensional projection histogram may be examined and continuous regions with non-zero bin entries may be identified 410. In some embodiments of the present invention, the theta projection histogram may be blurred prior to identification of continuous regions to avoid over segmenting a text block.

The plurality of identified continuous regions in each one-dimensional projection histogram may be pruned 412. In some embodiments of the present invention, pruning 412 may comprise computing, for each identified region, the percentage of corner features according to:

$$\frac{\text{sum of bin values in the region}}{\text{sum of all bin values in the histogram}} \times 100.$$

In some embodiments of the present invention, an identified continuous region may be pruned 412 from the plurality of identified continuous regions associated with a one-dimensional projection histogram when the percentage of corner features computed for the identified continuous region meets a first criterion. For each histogram bin within a pruned region, the bin count may be set to zero. In some embodiments of the present invention, an identified continuous region may be pruned 412 from the plurality of identified continuous regions associated with a one-dimensional projection histogram when the percentage of corner features computed for the identified continuous region is less than a threshold value. In an exemplary embodiment of the present invention, the threshold value may equal 2%.

The vertical extent of text may be determined 414. In some embodiments of the present invention, the smallest indexed rho value, in the rho projection histogram, that has an associated bin value greater than zero may be denoted rhoTop, and the largest indexed rho value, in the rho projection histogram, that has an associated bin value greater than zero may be denoted rhoBottom. The rhoTop and rhoBottom values may delineate the vertical extent of text in the projected corner map.

Likely text blocks may be identified 416 using the theta projection histogram. For each continuous region in the plurality of continuous regions identified in the theta projection histogram, a start indexed theta value may be identified and an end indexed theta value may be identified. The start indexed theta value associated with a continuous region may be the smallest indexed theta value, in the theta projection histogram, that has an associated bin value greater than zero. The end indexed theta value associated with a continuous region may be the largest indexed theta value, in the theta projection histogram, that has an associated bin value greater than zero. Denoting a start indexed theta value associated with an ith continuous region in the plurality of continuous regions identified in the theta projection histogram Ri.start and an end indexed theta value associated with the ith continuous region in the plurality of continuous regions identified in the theta projection histogram Ri.end, then a corresponding text region may be defined by a rectangle with indexed polar corner coordinates:

(rhoTop,Ri.start)
(rhoBottom,Ri.start)
(rhoTop,Ri.end)
(rhoBottom,Ri.end).

The polar coordinates of the corners of each text region may be computed from the indexed polar coordinates, and the inverse projection of the polar coordinates to the corresponding locations in the corner-feature image may be performed 418.

Referring again to FIG. 1, an initial plurality of candidate boundary contours may be generated 110 from the edge-map image. Some embodiments of the present invention may use OpenCV's findContours method to generate a list of initial candidate boundary contours. Alternative embodiments of the present invention may use one of many contour extraction methods known in the art to generate the initial plurality of candidate boundary contours. A contour, in the initial plurality of candidate boundary contours, may be described by the end points of each horizontal run of edge pixels in the contour, each vertical run of edge pixels in the contour and each diagonal run of edge pixels in the contour.

The initial plurality of candidate boundary contours generated from the edge-map image may be filtered 112 to remove contours associated with document content and background.

In some embodiments of the present invention, a plurality of candidate boundary contours may be trimmed based on a length measure. In some embodiments of the present invention, the length measure may be the sum of the lengths of the pixel runs, vertical, horizontal and diagonal, describing the candidate boundary contour. In alternative embodiments of the present invention, the length measure may be a weighted sum of the lengths of the pixel runs, vertical, horizontal and diagonal, describing the candidate boundary contour. In some exemplary embodiments, the length of a diagonal run may be weighted by a factor of $\sqrt{2}$ relative to the weighting of the length of a horizontal run or a vertical run. In alternative embodiments, the weighting factors may be determined based on the aspect ratio of the edge-map image. In alternative embodiments of the present invention, other length measures known in the art may be used to compute the length of a candidate boundary contour.

In some embodiments of the present invention, a candidate boundary contour may be removed from a plurality of candidate boundary contours when the length of the candidate boundary contour is below a significance threshold. In some embodiments of the present invention, the significance threshold may be defined in relation to the dimensions of the edge-map image. In some embodiments of the present invention, the significance threshold may be set to one fourth of the maximum image dimension of the edge-map image.

In some embodiments of the present invention, a plurality of candidate boundary contours may be trimmed based on the text-exclusion rectangle(s). In some embodiments, any candidate boundary contour, from the plurality of candidate boundary contours, that lies entirely within a text-exclusion rectangle may be removed from the plurality of candidate boundary contours. A coordinate of a text-exclusion rectangle may be scaled from the medium-scale of the corner-feature image from which the text-exclusion rectangle was detected to the low-scale of the edge-map image from which the initial plurality of candidate contours was generated.

In some embodiments of the present invention, a candidate boundary contour may be split at a critical point within the candidate boundary contour. An examination point, on the candidate boundary contour, whereat a first contour segment and a second contour segment meet, may be defined as a critical point if both the first contour segment and the second contour segment satisfy a length criterion and the angle between the first contour segment and the second contour segment is less than a critical-angle threshold. If the first contour segment does not satisfy the length criterion, then a third segment may be identified. The third segment may be the segment joining the examination point with a third point on the candidate boundary contour, whereat the third point on the candidate boundary contour is at a predefined distance from the examination point and is on the same side of the examination point as the non-examination-point end of the first contour segment. Similarly, if the second contour segment does not satisfy the length criterion, then a fourth segment may be identified. The fourth segment may be the segment joining the second point on the candidate boundary contour with a fourth point on the candidate boundary contour, whereat the fourth point on the candidate boundary contour is at the predefined distance from the second point and is on the same side of the second point as the non-first-point end of the second contour segment. If the first contour segment does not satisfy the length criterion but the second contour segment does satisfy the length criterion, then the examination point may be defined as a critical point if the angle between the third segment and the second contour segment is less than the critical-angle threshold. If the first contour segment does satisfy the length criterion but the second contour segment does not satisfy the length criterion, then the examination point may be defined as a critical point if the angle between the first contour segment and the fourth segment is less than the critical-angle threshold. If the first contour segment does not satisfy the length criterion and the second contour segment does not satisfy the length criterion, then the examination point may be defined as a critical point if the angle between the third segment and the fourth segment is less than the critical-angle threshold.

In some embodiments of the present invention, the length criterion is satisfied when a segment is greater in length than a length threshold. In some embodiments of the present invention, the predefined distance and the length threshold may be the same. In an exemplary embodiment of the present invention, the predefined distance and the length threshold may be 3 pixels. In an exemplary embodiment of the present invention, the critical-angle threshold may be 100 degrees.

The angle, which may be denoted θ, between a first line segment and a second line segment with a common endpoint may be computed according to:

$$\theta = \cos^{-1}\left(\frac{v1}{\|v1\|} \cdot \frac{v2}{\|v2\|}\right),$$

where v1 is a vector along the first line segment with its tail at the common endpoint, v2 is a vectors along the second line segment with its tail at the common endpoint and • denotes the vector dot product. In some embodiments of the present invention, an angle in a critical-point determination may be computed according to the above equation. In some embodiments of the present invention, the length of each vector may be defined to be the value of the predefined distance used in the critical-point determination.

Figure 5:
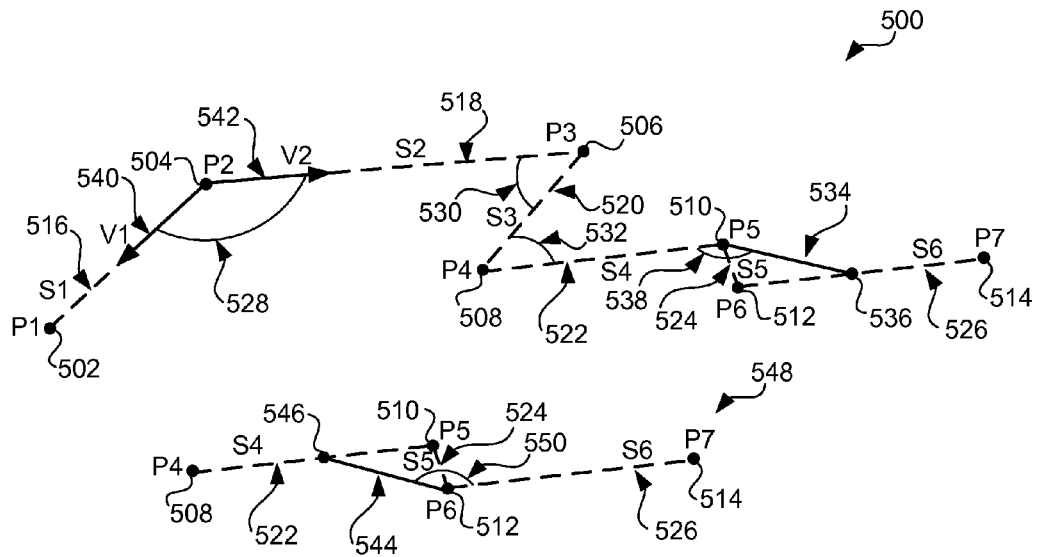
FIG. 5 is a picture illustrating critical-point determination according to some embodiments of the present invention.

A critical point may be further understood in relation to FIG. 5. For example, FIG. 5 depicts an exemplary portion of a contour 500, shown in dashed-line segments. The exemplary portion of the contour 500 consists of several contour segments defined by seven points, P1 502, P2 504, P3 506, P4 508, P5 510, P6 512 and P7 514: a first contour segment S1 516 with endpoints P1 502 and P2 504; a second contour segment S2 518 with endpoints P2 504 and P3 506; a third contour segment S3 520 with endpoints P3 506 and P4 508; a fourth contour segment S4 522 with endpoints P4 508 and P5 510; a fifth contour segment S5 524 with endpoints P5 510 and P6 512; and a sixth contour segment S6 526 with endpoints P6 512 and P7 514.

At point P2 504, both contour segments that meet at P2 504, the first contour segment S1 516 and the second contour segment S2 518, are greater in length than an exemplary length threshold, as illustrated by the two vectors V1 540 and V2 542, which are of length equal to the exemplary length threshold. Since the angle 528, between the first contour segment S1 516 and the second contour segment S2 518, is greater than an exemplary critical-angle threshold of 100 degrees, point P2 504 is not a critical point. Since the second contour segment S2 518 and the third contour segment S3 520 are greater in length than the exemplary length threshold but the angle 530 between the second contour segment 518 and the third contour segment 520 is less than the exemplary critical-angle threshold of 100 degrees, point P3 506 is a critical point, and the exemplary contour 500 will be split at point P3 506. Similarly, the third contour segment S3 520 and the fourth contour segment S4 522 are greater in length than the exemplary length threshold but the angle 532 between the third contour segment 520 and the fourth contour segment 522 is less than the exemplary critical-angle threshold of 100 degrees, point P4 508 is a critical point, and the exemplary contour 500 will be split at point P4 508. However, the fifth contour segment S5 524 is less in length than the exemplary length threshold, so a new segment 534 is identified. The new segment 534 is a segment from the fifth point P5 510 to a point 536, on the exemplary contour 500, that is a predefined distance from point P5 510 and is on the same side of point P5 510 as point P6 512. And point P5 510 is not a critical point because the angle 538 between contour segment S4 522 and the new segment 534 is greater than the critical-angle threshold. When examining the sixth point P6 512 to determine if it is a critical point, a new segment 544 from point P6 512 to a new point 546 is identified and used in the computation of the angle 550 between the new segment 544 and the sixth contour segment S6 526. A portion 548 of the exemplary contour 500 is redrawn for clarity for illustrating the examination of the sixth point P6 512. And point P6 512 is not a critical point because the angle 550 between the new segment 544 and the sixth contour segment S6 526 is greater than the critical-angle threshold. Thus, this exemplary portion 500 of a contour is only split at critical points P3 506 and P4 508.

Figure 6:
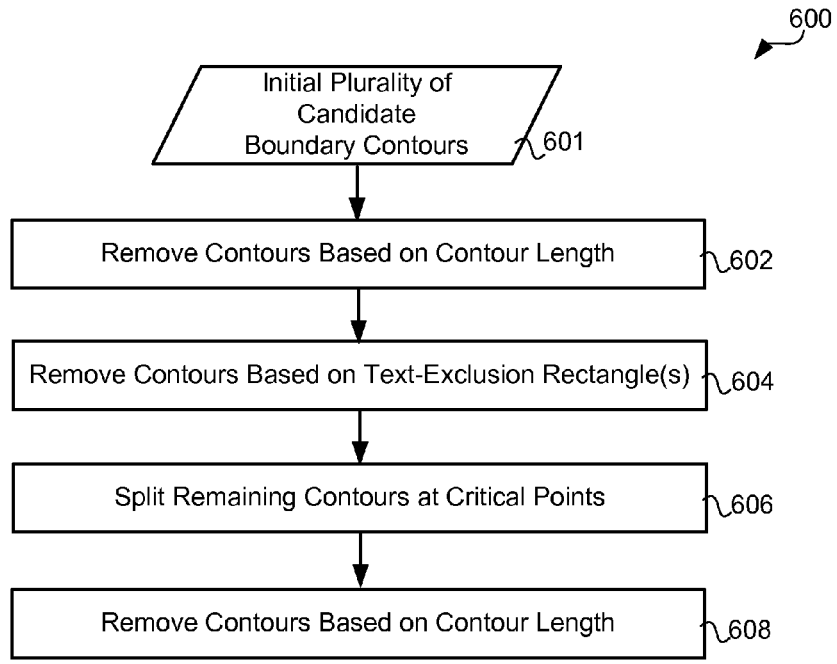
FIG. 6 is a chart showing exemplary embodiments of method, according to some embodiments of the present invention, for filtering an initial plurality of candidate boundary contours to generate a final plurality of candidate boundary contours.

Some embodiments of the present invention, described in relation to FIG. 6, may comprise a method 600 for filtering the initial plurality of candidate boundary contours 601 generated from the edge-map image. A first plurality of candidate boundary contours may be generated by removing, from the initial plurality of candidate boundary contours 601, candidate boundary contours based on contour length 602, as described above herein, using a first length threshold. A second plurality of candidate boundary contours may be generated by removing, from the first plurality of candidate boundary contours, candidate boundary contours based on text-exclusion rectangle(s) 604, as described above herein. A third plurality of candidate boundary contours may be generated by splitting 606 the second plurality of candidate boundary contours at critical points, as described above herein. A final plurality of candidate boundary contours may be generated by removing, form the third plurality of candidate boundary contours, candidate boundary contours based on contour length 608, as described above herein, using a second length threshold. In some embodiments of the present invention, the value of the first length threshold and the value of the second length threshold may be equal. In alternative embodiments of the present invention, the value of the first length threshold and the value of the second length threshold may not be equal.

In alternative embodiments of the present invention, the three methods for removing candidate boundary contours from a plurality of candidate boundary contours: the length-based removal method; the text-exclusion-rectangles-based removal method; and the-splitting-at-critical-points-followed-by-length-based removal method, may be arranged in another order other than the order shown in FIG. 6.

Referring again to FIG. 1, the candidate boundary contours in the final plurality of candidate boundary contours may be re-scaled to the scale of the document image.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for generating a plurality of candidate boundary contours from a document image, said method comprising:
preprocessing a document image to form a medium-scale luminance image and a low-scale luminance image;
extracting a plurality of corner features from said medium-scale luminance image;
extracting a plurality of edge features from said low-scale luminance image;
determining a plurality of vanishing points;
detecting one or more text regions in a corner-feature image associated with said plurality of corner features;
generating an initial plurality of candidate boundary contours in an edge-map image associated with said plurality of edge features;
filtering said initial plurality of candidate boundary contours using said one or more text regions as follows:
identifying a critical point in a first candidate boundary contour in said initial plurality of candidate boundary contours;
splitting said first candidate boundary contour at said critical point into a second candidate boundary contour and a third candidate boundary contour; and
wherein said second candidate boundary contour length is greater in length than a length threshold and said third candidate boundary contour length is greater in length than said length threshold.

2. A method as described in claim 1, wherein said preprocessing said document image to form said medium-scale luminance image comprises:
applying a smoothing filter to an 8-bit grayscale image associated with said document image; and
re-sampling said smoothed 8-bit grayscale image to a medium resolution thereby producing a medium-scale luminance image of lower resolution than said 8-bit grayscale image.

3. A method as described in claim 1, wherein said preprocessing said document image to form said low-scale luminance image comprises:
applying a smoothing filter to an 8-bit grayscale image associated with said document image;
re-sampling said smoothed 8-bit grayscale image to a medium resolution thereby producing a medium-scale luminance image of lower resolution than said 8-bit grayscale image;
applying a uniform-blur filter to said medium-scale luminance image; and
re-sampling said uniformly-blurred medium-scale image to a low resolution thereby producing a low-scale luminance image of lower resolution than said medium-scale luminance image.

4. A method as described in claim 1, wherein said preprocessing said document image to form said medium-scale luminance image and said low-scale luminance image comprises converting said document image to an 8-bit grayscale image.

5. A method as described in claim 1, wherein said determining a plurality of vanishing points comprises:
generating a binary edge mask by filtering said edge-map image to form text blocks; and
using said binary edge mask to determine said plurality of vanishing points.

6. A method as described in claim 1, wherein said detecting one or more text regions in said corner-feature image comprises:
identifying a document spine in said edge-map image;
identifying a first vanishing point, wherein said first vanishing point is intersected by said document spine;
projecting said extracted corner features into a polar coordinate system;
forming a first one-dimensional projection histogram corresponding to a first direction in a projected corner-feature image generated from said extracted corner features projected into said polar coordinate system;
forming a second one-dimension projection histogram corresponding to a second direction in said projected corner-feature image generated from said extracted corner features projected into said polar coordinate system;

identifying a first plurality of continuous regions in said first one-dimensional projection histogram;

identifying a second plurality of continuous regions in said second one-dimensional projection histogram;

pruning said first plurality of continuous regions;

pruning said second plurality of continuous regions;

determining a vertical extent of text using said pruned first plurality of continuous regions;

identifying one or more likely text blocks using said vertical extent of text and said second plurality of continuous regions; and performing an inverse projection from said polar coordinate system of said one or more likely text blocks.

7. A method as described in claim 1, wherein said filtering said initial plurality of candidate boundary contours comprises generating a first plurality of candidate boundary contours by removing any candidate boundary contour in said initial plurality of candidate boundary contours with a length less than a length threshold.

8. A method as described in claim 1, wherein said filtering said initial plurality of candidate boundary contours comprises generating a first plurality of candidate boundary contours by removing any candidate boundary contour in said initial plurality of candidate boundary contours that lies entirely within said one or more text blocks.

9. A non-transitory computer-readable medium encoded with a computer program code for causing a processor to execute a method for generating a plurality of candidate boundary contours from a document image, said method comprising:

preprocessing a document image to form a medium-scale luminance image and a low-scale luminance image;

extracting a plurality of corner features from said medium-scale luminance image;

extracting a plurality of edge features from said low-scale luminance image;

determining a plurality of vanishing points;

detecting one or more text regions in a corner-feature image associated with said plurality of corner features;

generating an initial plurality of candidate boundary contours in an edge-map image associated with said plurality of edge features;

filtering said initial plurality of candidate boundary contours using said one or more text regions, wherein said filtering said initial plurality of candidate boundary contours comprises:

identifying a critical point in a first candidate boundary contour in said initial plurality of candidate boundary contours;

splitting said first candidate boundary contour at said critical point into a second candidate boundary contour and a third candidate boundary contour; and, wherein said second candidate boundary contour is greater in length than a length threshold and said third candidate boundary contour when said third candidate boundary contour is greater in length than said length threshold.

10. A non-transitory computer-readable medium as described in claim 9, wherein, in said method, said preprocessing said document image to form said medium-scale luminance image comprises:

applying a smoothing filter to an 8-bit grayscale image associated with said document image; and re-sampling said smoothed 8-bit grayscale image to a medium resolution thereby producing a medium-scale luminance image of lower resolution than said 8-bit grayscale image.

11. A non-transitory computer-readable medium as described in claim 9, wherein, in said method, said preprocessing said document image to form said low-scale luminance image comprises:

applying a smoothing filter to an 8-bit grayscale image associated with said document image;

re-sampling said smoothed 8-bit grayscale image to a medium resolution thereby producing a medium-scale luminance image of lower resolution than said 8-bit grayscale image;

applying a uniform-blur filter to said medium-scale luminance image; and re-sampling said uniformly-blurred medium-scale image to a low resolution thereby producing a low-scale luminance image of lower resolution than said medium-scale luminance image.

12. A non-transitory computer-readable medium as described in claim 9, wherein, in said method, said preprocessing said document image to form said medium-scale luminance image and said low-scale luminance image comprises converting said document image to an 8-bit grayscale image.

13. A non-transitory computer-readable medium as described in claim 9, wherein, in said method, said determining a plurality of vanishing points comprises:

generating a binary edge mask by filtering said edge-map image to form text blocks; and using said binary edge mask to determine said plurality of vanishing points.

14. A non-transitory computer-readable medium as described in claim 9, wherein, in said method, said detecting one or more text regions in said corner-feature image comprises:

identifying a document spine in said edge-map image;

identifying a first vanishing point, wherein said first vanishing point is intersected by said document spine;

projecting said extracted corner features into a polar coordinate system;

forming a first one-dimensional projection histogram corresponding to a first direction in a projected corner-feature image generated from said extracted corner features projected into said polar coordinate system;

forming a second one-dimension projection histogram corresponding to a second direction in said projected corner-feature image generated from said extracted corner features projected into said polar coordinate system;

identifying a first plurality of continuous regions in said first one-dimensional projection histogram;

identifying a second plurality of continuous regions in said second one-dimensional projection histogram;

pruning said first plurality of continuous regions;

pruning said second plurality of continuous regions;

determining a vertical extent of text using said pruned first plurality of continuous regions;

identifying one or more likely text blocks using said vertical extent of text and said second plurality of continuous regions; and performing an inverse projection from said polar coordinate system of said one or more likely text blocks.

15. A non-transitory computer-readable medium as described in claim 9, wherein, in said method, said filtering said initial plurality of candidate boundary contours comprises generating a first plurality of candidate boundary contours by removing any candidate boundary contour in said initial plurality of candidate boundary contours with a length less than a length threshold.

16. A non-transitory computer-readable medium as described in claim 9, wherein, in said method, said filtering said initial plurality of candidate boundary contours comprises generating a first plurality of candidate boundary contours by removing any candidate boundary contour in said initial plurality of candidate boundary contours that lies entirely within said one or more text blocks.

* * * * *